Sept. 9, 1958 H. BOUCKE 2,851,030
PULSE OSCILLOGRAPHY
Filed Sept. 12, 1955 2 Sheets-Sheet 2

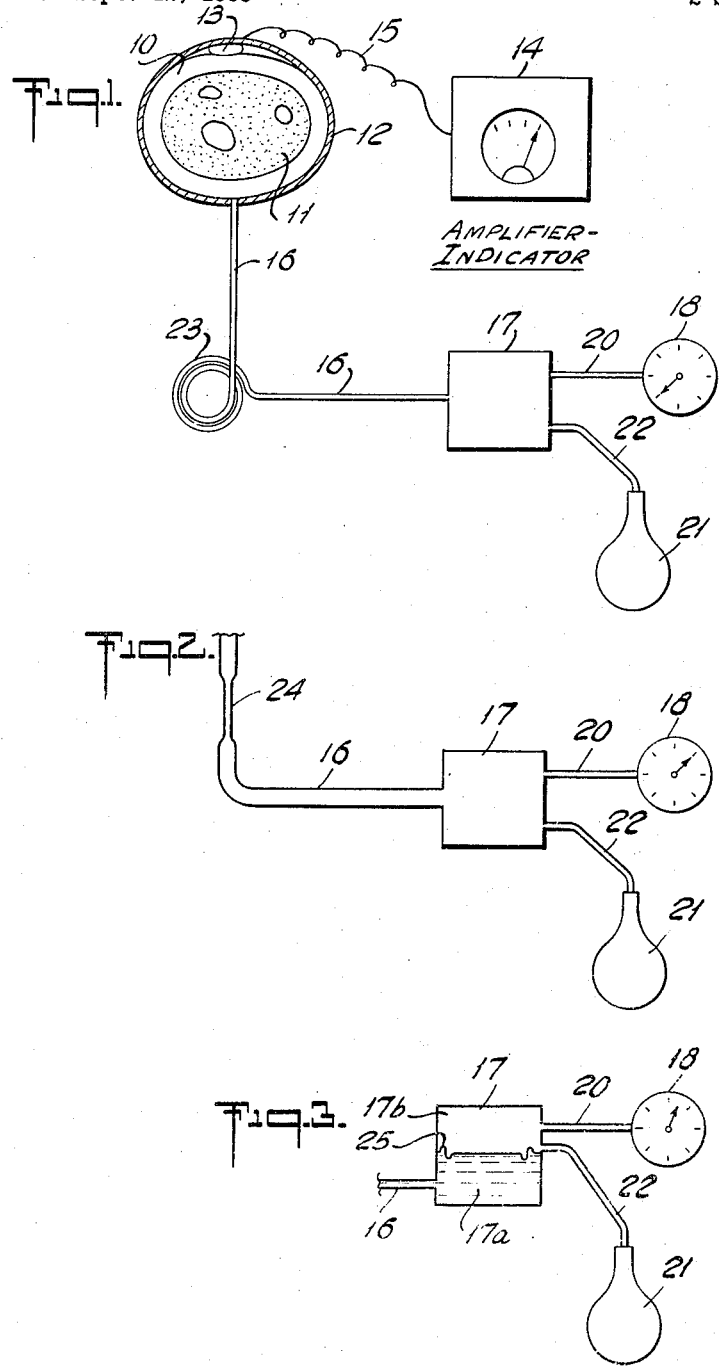

INVENTOR
HEINZ BOUCKE
BY
ATTORNEY

United States Patent Office

2,851,030
Patented Sept. 9, 1958

2,851,030
PULSE OSCILLOGRAPHY

Heinz Boucke, Tuebingen, Germany, assignor to Radio Patents Company, a partnership Application September 12, 1955, Serial No. 533,606

13 Claims. (Cl. 128—2.05)

The present invention relates to pulse oscillography, that is, the indication and/or recording of arterial or venous pulsations and other pulsatile physiological body movements of both humans and animals, more particularly to improved means for and a method of recording the pulsations by the aid of an inflatable pressure cuff or bag, such as a limb or digital cuff, serving to convert the body movements or pulsations to be recorded into corresponding pressure changes of a gas or fluid for subsequent conversion into variations of electric current or potential suitable for direct indication and/or recording.

In arrangements of this type, it has been found necessary to provide and maintain a constant or steady cuff pressure upon which are superimposed the arterial or other pulsations to be recorded, in order to insure a maximum amplitude of the recorded variations and to avoid indicating errors due to fluctuations of the steady cuff pressure. It has been found, especially in the case of a limb or digital cuff, that changes in the position or volume of the cuff, such as caused by a mere bending of the patient's elbow or other movements of the patient, with the ensuing variations of the steady cuff pressure resulted in a considerable change in the amplitude and other characteristics of the pulsations being recorded.

Accordingly among the objects of the present invention is the provision of improved means for and a method of overcoming the above and related difficulties, more particularly, to provide a novel pulse oscillometer by which the effects of steady cuff pressure fluctuations are minimized or practically eliminated.

The invention has special advantages for use in connection with differential pressure oscillometers which comprise a flexible diaphragm as a pressure converting device between the cuff and a suitable electrical transducer, said diaphragm being balanced on both sides by the steady or average cuff pressure to increase its sensitivity in respect to the pulsations to be recorded. A more specific object of the invention is the provision of an improved construction of a device of this type to insure equal balancing pressures of the recording diaphragm, both during recording of the pulses or other fluctuations as well as during inflation or release of the pressure, to prevent damage of the diaphragm and other related drawbacks and difficulties.

Further objects as well as novel aspects of the invention will be better understood from the following detailed description taken in reference to the accompanying drawings forming part of this specification and wherein:

Fig. 1 is a schematic block diagram of a simple pulse oscillometer system utilizing an inflatable pressure cuff and an electrical transducer and embodying the improvements according to the invention;

Figs. 2 and 3 are partial views indicating modifications of Fig. 1;

Like reference characters identify like parts in the different views of the drawings.

Figure 4:
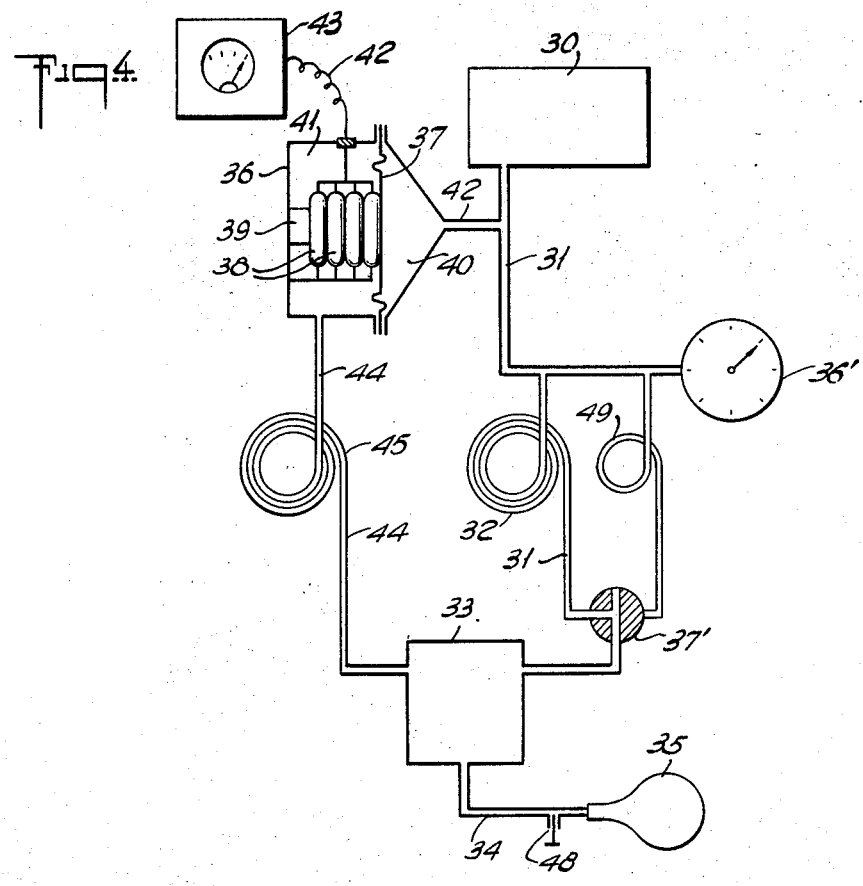
Fig. 4 shows an oscillometer system similar to Fig. 1 utilizing a differential pressure recorder and embodying the improvements of the invention.

With the foregoing objects in view, the invention involves generally the provision in a pulse oscillometer system of a buffer space or chamber connected to the pressure recording cuff of said system through a restricted passage or narrow tubing and having a volume which is a substantial multiple of the volume enclosed by said cuff. As a result, the effects of fluctuations of the average or steady cuff pressure will be reduced to an extent equal to the ratio of the volume of the buffer space to the volume enclosed by said cuff. For practical purposes, the volume of the buffer space should be at least ten times the cuff volume, as a result of which the effect of the steady pressure fluctuations on the recorded pulsations will be reduced to one-tenth, that is, to an extent to become negligible from a practical standpoint. According to tests made, it was found, for instance, that with a cuff applied to the radial artery without the provision of a buffer chamber according to the invention, a slight twist of the arm resulted in an increase of the steady cuff pressure from 50 mm./Hg to 65 mm./Hg, accompanied by an almost 100% increase of the recorded pulse amplitude. This indication of the pulse amplitude provides a completely erroneous picture, since the pulse amplitude is definitely related to the systolic and diastolic blood pressure and together with the latter serves as a basis for diagnosing purposes. The tests have further shown that with the provision of buffer space according to the invention, the pulse amplitude remains substantially constant and equal to the amplitude prior to the change of the steady cuff pressure.

Furthermore, by the invention the arterial or venous pulsations or other pulsatile body movements to be recorded, are prevented from entering the buffer, provided a proper design of the narrow connecting passages in the manner described hereafter, thus insuring optimum recording efficiency and fidelity of the pulse waves or other pulsatile body movements.

Referring more particularly to Fig. 1, the cuff 10, in the form of an inflatable bag or the like, is secured to the arm 11 by a band or strap 12 or in any other suitable manner. An electrical transducer or pickup 13 being interposed between the cuff 10 and strap 12 serves to convert the pulsations or cuff pressure variations into corresponding electrical changes for indication and/or recording by a suitable recording apparatus 14 connected to the pickup 13 through a flexible conductor 15. In practice any electrocardiograph amplifier and recorder has been found suitable for recording the potential variations produced by the pickup 13 which may be of any suitable type, preferably an electrostatic transducer or microphone as described in my copending application Serial No. 277,817, filed March 21, 1952, entitled Electrostatic Transducer, now Patent No. 2,755,796.

In order to inflate the cuff 10 to a desired steady operating pressure, it is connected with a suitable fluid pressure supply source or pump, such as in the form of a simple rubber bulb 21 conventionally used in connection with sphygmographic devices for inflating the cuff 10. In order to minimize the effects of the undesirable steady cuff pressure fluctuations, there is inserted, according to the invention, in the connecting lines 16 and 22 between the cuff 10 and pump 21 an equalizing space or buffer chamber 17 arranged close to the pump and a narrow passage element, shown in the form of a wound-up tubing 23, arranged close to the cuff 10. There may further be provided a standard pressure gauge 18 connected to the chamber 17 for indicating the steady cuff pressure.

The volume enclosed by the buffer chamber 17 is a multiple of the volume enclosed by the cuff 10, practically at least ten times the volume of the latter, whereby the effects of volume or corresponding pressure changes in the cuff will be reduced accordingly, in the manner pointed out above. The effect of the narrow passage or tubing 23 is to prevent the relatively rapid pressure changes in the cuff in response to the arterial or other pulsatile body movements from being applied to the chamber 17, thus insuring a maximum recording amplitude and fidelity of the pulse wave in the output of the pickup or pressure transducer 13.

According to experiments and tests made, satisfactory results have been obtained with a plastic tubing 23 wound into a convolute spiral, said tubing having an inside diameter of about one to two millimeters and a length from five to ten meters. Such an arrangement constitutes an efficient acoustic filter blocking the pulsatile changes or pressure variations from entering the buffer space.

In place of a wound-up tubing, as shown in Fig. 1, a similar effect can be obtained by a simple restricted or narrow portion in the connecting tube 16, as shown at 24 in Fig. 2, wherein the remaining parts are substantially similar to those of Fig. 1.

According to a modified arrangement, the cuff 10, the connecting tube 16, narrow passage 23 or 24 and a portion of the buffer space 17 may be filled with a suitable liquid, such as glycerin, a flexible diaphragm being arranged at the transition point to serve as a means of converting the pneumatic pressure in the remaining space of the buffer 17 into liquid pressure, as shown by the partial diagram of Fig. 3. In the latter the chamber 17 is divided into two spaces 17a and 17b by a flexible diaphragm 25 acting as a separating wall. The lower chamber 17a, connecting tube 16 and pressure cuff 10, are filled with a liquid, such as glycerin, while the upper chamber 17b is connected with the pressure supply or pump 21 and pressure gauge 18, in the same manner as in Fig. 1. As a result, upon inflation of the space 17b, the pneumatic pressure is transferred by the diaphragm 25 to produce a corresponding liquid pressure in the cuff 10. Alternatively, the diaphragm 25 may be arranged in an enlarged portion of the connecting tube 16 which latter includes a narrow passage or wound-up tubing to prevent the pressure pulsations resulting from the pulsatile body movement to be recorded from entering the buffer 17, in substantially the same manner as in Figs. 1 and 2.

Fig. 4 shows a pulse oscillometer system according to the invention utilizing a differential pressure device for converting the cuff pulsations into corresponding vibrations of a flexible diaphragm for subsequent indication and/or recording. The cuff 30, connecting line 31, narrow spiral tubing 32, buffer chamber 33, connecting line 34 and pump 35, substantially correspond, respectively, to items 10, 16, 23, 17, 22 and 21 of Fig. 1, with the exception of the provision of a two-way valve 37' in the line 31 and the arrangement of the pressure gauge 36' close to the cuff 30. There is further provided, according to this modification of the invention, a differential pressure box 36 having mounted therein a flexible diaphragm 37 dividing the box into separate spaces 40 and 41, the former being connected with the cuff 30 through a connecting line or tube 42. The space 41 includes the pressure converter 38 consisting, in the example shown, of a stack of condenser transducers arranged with one end of the stack engaging the diaphragm 37 and with the opposite end engaging an abutment member 39 secured to the inside of the box 36. The transducers 38 which advantageously are of the type described in the above-mentioned patent application, are electrically connected in parallel and to the input of a pressure indicator and/or recorder 43 by way of a flexible connector 42.

In order to obtain maximum response sensitivity to the pressure pulsations in the cuff 30, the steady or static pressures in the spaces 40 and 41 on the opposite sides of the diaphragm 37 are balanced by connecting the chamber 41 with the buffer space 33 through a connecting line 44. Accordingly, if both pressures are equalized, the diaphragm is actuated by the differential pressure, that is, the pressure pulsations only, thus enabling it to be constructed with a minimum of weight or mass to result in a faithful recording of the pulsations in the cuff 30 resulting from the arterial or other pulsatile body movements to be recorded. The variations of the pressure in the space 40 in accordance with the pulsations are prevented from entering the buffer space 33 by the narrow passage or tubing 32 between the cuff 30 and buffer 33, in the manner described hereinbefore. In addition, the buffer 33 has the effect of minimizing fluctuations of the steady cuff pressure caused by volume changes of the cuff 30, as a result of movement of the patient and other causes.

There is thus insured, in an arrangement as described, an accurate balance of the steady pressures in the spaces 40 and 41 of the differential converter or pressure box, during the periods of recording of the pressure pulsations, in the manner described in the foregoing. Such a balance may be disturbed, however, during the inflation of the cuff by the pump 35 and release of the pressure, in that the pressure in one of the chambers 40 or 41 may rise or fall at a rate different from that in the other chamber. In such a case, an excessive deflection will occur temporarily of the diaphragm 37, liable to result in damage or destruction thereof. Moreover, excessive voltage rises may result in the amplifier of a recorder 43 causing other undesirable effects, as will be understood.

In order to obviate these drawbacks and disadvantages, in accordance with the present invention, means are provided in the form of a further spirally wound narrow tubing 45 connected in the line 44 between the space 41 of the pressure box 36 and the buffer 33. By the proper design of tubing 45 in relation to the tubing 32, that is, such as to provide identical time constants for the steady pressure changes in the spaces 40 and 41, equal continuously balanced static pressures on either side of the diaphragm 37 will be insured at all times. By equal time constants are understood, therefore, in analogy to the electrical art, identical rise times or curves representing the instantaneous pressures in the chambers 40 and 41 as a function of time upon application or change of the input pressure by the bulb 35 or equivalent fluid pressure source. In other words, in Fig. 4 the wound-up tubing 23 of Fig. 1 is sub-divided into two portions 32 and 45 having one of their ends connected, respectively, with the spaces 40 and 41 of the pressure box 36 and having their opposite ends connected with the buffer 33, whereby to secure the effects and benefits of Fig. 1 in addition to insuring continuously balanced static pressures on the opposite sides of diaphragm 37.

An arrangement of this type has special advantages in connection with intermittent recording systems and methods of the type involving a step-by-step or gradual rise or fall of the steady cuff pressure, such as by the use of an escape valve, as indicated at 48. In such a case there is insured by the invention a continuous pressure balance without any danger to the diaphragm 37 or overloading of the amplifier of the indicator or recorder 43.

If a different cuff 30 is used, such as when changing from a limb cuff to a digit cuff of different size or volume, the balance may be reestablished by connecting a different tubing 49 in place of the tubing 32 by control of the valve 37', in a manner readily understood.

Figure 5:
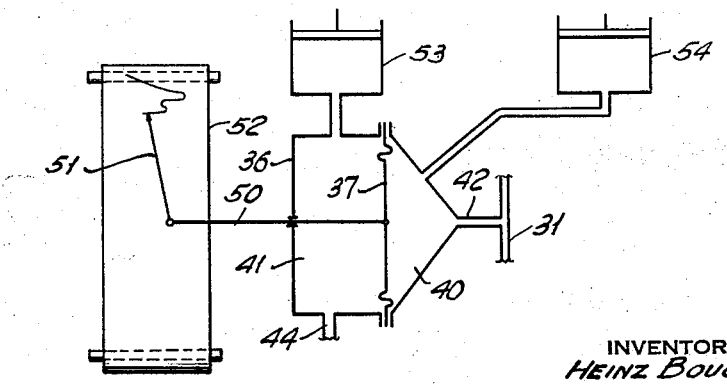
Fig. 5 is a partial view illustrating a modification of Fig. 4.

Other means for equalizing the time constants of the steady pressure changes consist in the provision of adjustable equalizing spaces connected with the pressure chambers 40 and 41 of the pressure box 36, as shown at 53 and 54 in Fig. 5. By a proper control of the additional spaces, such as by means of adjustable pistons or the like, as shown in the drawing, equalizing or balancing of the pressures can again be achieved and the device adjusted for maximum efficiency and fidelity of recording and/or indication of the cuff pressure pulsations. In operation, the balance may be controlled and/or adjusted by temporarily raising or lowering the pressure in the buffer 33, such as by a slight compression of the bulb 35 or by providing a flexible window or wall of the buffer chamber being slightly deflected by digital or other pressure. In such a case, the output meter of the indicator 43 will remain in its zero or central position if a full balance has been achieved between the pressures in the spaces 40 and 41 of the pressure box 36. By similarly testing the cuff 30, that is, by slight digital or other pressure, it is furthermore possible to determine the relationship between the different time constants, that is, which of the narrow tubings 32 and 45 or equalizing spaces 53 and 54 has to be increased or decreased, respectively, in order to establish the equality of the time constants.

Referring further to Fig. 5, there is shown a simplified recorder of the type described with means for directly recording the deflections of the diaphragm 37 upon a moving chart 52 by means of a stylus 51, the latter being connected to the diaphragm 37 through a rod 50 or linkage mechanism hermetically and slidably passing through pressure box 36, in the manner indicated in the drawing.

In the foregoing the invention has been described with specific reference to an illustrative device. It will be evident, however, that numerous variations and modifications, as well as the substitution of equivalent elements for those shown for illustration, may be made without departing from the broader scope and spirit of the invention, as set forth in the appended claims. The specification and drawings are accordingly to be regarded in an illustrative rather than in a limiting sense.

What is claimed is:

1. An oscillometer comprising an inflatable pressure bag with means for applying the same to a human or animal body for converting pulsatile physiological body movements into proportionate fluid pressure variations within said bag, means to indicate and/or record said fluid pressure variations, a buffer chamber having a volume of at least ten times the volume enclosed by said bag, connecting means between said chamber and said bag, and narrow passage means inserted in said connecting means designed to subject said chamber to the same steady fluid pressure as said bag and to prevent pressure variations in said bag in response to pulsatile body movements from entering said chamber.

2. An oscillometer comprising an inflatable pressure bag with means for applying the same to a human or animal body for converting pulsatile physiological body movements into proportionate fluid pressure variations within said bag, means to indicate and/or record said fluid pressure variations, a buffer chamber having a volume of at least ten times the volume enclosed by said bag, connecting means between said chamber and said bag, and a spirally wound tube inserted in said connecting means and having a length and cross-section such as to subject said chamber to the same steady fluid pressure as said bag and to prevent pressure variations in said bag in response to the pulsatile body movements from entering said chamber.

3. A pulse oscillometer comprising an inflatable pressure cuff with means for applying the same to a body extremity for converting pulse beat fluctuations into proportionate fluid pressure variations within said cuff, means to indicate and/or record said fluid pressure variations, a buffer chamber having a volume of at least ten times the volume enclosed by said cuff, connecting means between said chamber and said cuff, and narrow passage means inserted in said connecting means having a length and cross-section such as to subject said chamber to the same steady fluid pressure as said cuff and to prevent fluid pressure variations in said cuff in response to pulsatile body movements from entering said chamber.

4. A pulse oscillometer comprising an inflatable pressure cuff with means for applying the same to a body extremity for converting pulse beat fluctuations into proportionate fluid pressure variations within said cuff, means to indicate and/or record said fluid pressure variations, a buffer chamber having a volume at least ten times the volume enclosed by said cuff, connecting means between said chamber and said cuff, and flexible tubing means wound into a convolute spiral and inserted in said connecting means, said tubing means having a length and cross-section such as to subject said chamber to the same steady fluid pressure as said cuff and to prevent fluid pressure variations in said cuff in response to pulsatile body movements from entering said chamber.

5. An oscillometer comprising an inflatable pressure bag with means for applying the same to a human or animal body for converting pulsatile physiological body movements into proportionate fluid pressure variations within said bag, a buffer chamber having a volume of at least ten times the volume enclosed by said bag, connecting means between said chamber and said bag, means for applying compressed fluid to said chamber and bag, further means to indicate and/or record fluid pressure variations within said bag, and narrow passage means inserted in said connecting means having a length and cross-section such as to subject both said chamber and bag to the same steady fluid pressure and to prevent fluid pressure variations in said bag in response to pulsatile body movements from entering said chamber.

6. An oscillometer comprising an inflatable pressure bag with means for applying the same to a human or animal body for converting pulsatile physiological body movements into proportionate fluid pressure variations within said bag, a buffer chamber having a volume equal to a substantial multiple of the volume enclosed by said bag, connecting means between said chamber and said bag, means for applying compressed fluid to said chamber and bag, further means to indicate and/or record fluid pressure variations within said bag, and narrow flexible tubing means wound into a convolute spiral and inserted in said connecting means, said tubing means having a length and cross-section to cause the same steady fluid pressure in said chamber and said bag and to prevent fluid pressure variations in said bag in response to pulsatile body movements from entering said chamber.

7. An oscillometer comprising an inflatable pressure bag with means for applying the same to a human or animal body for converting pulsatile physiological body movements into proportionate fluid pressure variations within said bag, a differential pressure box including a vibratory member dividing the same into two pressure chambers, one of said pressure chambers being connected to said bag, a buffer chamber having a volume equal to a substantial multiple of the volume enclosed by said bag, first connecting means between said buffer chamber and said bag, second connecting means between said buffer chamber and the other pressure chamber, means for applying compressed fluid to said chambers and bag, a pair of narrow passage means each inserted in one of said connecting means and designed to provide equal time constants in respect to steady pressure fluctuations in said buffer chamber and said pressure chambers, thereby to equalize the steady fluid pressure within said pressure chambers and to prevent fluid pressure variations in said first pressure chamber and bag in response to pulsatile body movements from entering said buffer chamber, and means to indicate and/or record the vibrations of said vibratory member.

8. An oscillometer comprising an inflatable pressure bag with means for applying the same to a human or animal body for converting pulsatile physiological body movements into proportionate fluid pressure variations within said bag, a differential pressure box including a flexible diaphragm dividing the same into two pressure chambers, one of said pressure chambers connected to said bag, a buffer chamber having a volume equal to at least ten times the volume enclosed by said bag, first connecting means between said buffer chamber and said bag, second connecting means between said buffer chamber and the other of said pressure chambers, means for applying compressed fluid to said chambers and bag, and a pair of wound up flexible tubes each inserted in one of said connecting means and having a relative length and cross-section such as to equalize the steady fluid pressures within said pressure chambers and to prevent pressure variations in said first pressure chamber and bag in response to pulsatile body movements from entering said buffer chamber, and means to indicate and/or record the vibrations of said diaphragm.

9. A pulse oscillometer comprising an elastic pressure cuff with means for applying the same to a body extremity for converting pulse beat fluctuations into proportionate fluid pressure variations within said cuff, a differential pressure box including a flexible diaphragm dividing the same into two pressure chambers, one of said pressure chambers connected to said cuff, a buffer chamber having a volume equal to a substantial multiple of the volume enclosed by said cuff, first connecting means between said buffer chamber and said cuff, second connecting means between said buffer chamber and the other of said pressure chambers, a pair of narrow coiled up flexible tubes each inserted in one of said connecting means, means for supplying compressed fluid to said buffer chamber, said tubes having a relative length and cross-section such as to equalize the steady fluid pressures within said pressure chambers and to prevent fluid pressure variations in said first pressure chamber and cuff in response to pulse fluctuations from entering said buffer chamber, and means to indicate and/or record the vibrations of said diaphragm.

10. A pulse oscillometer comprising an elastic pressure cuff with means for applying the same to a body extremity for converting pulse beat fluctuations into proportionate fluid pressure variations within said cuff, a differential pressure box including a flexible diaphragm dividing the same into two pressure chambers, one of said pressure chambers connected to said cuff, a buffer chamber having a volume equal to at least ten times the volume enclosed by said cuff, first connecting means between said buffer chamber and said cuff, second connecting means between said buffer chamber and the other of said pressure chambers, means for applying compressed fluid to said buffer chamber, a pair of flexible narrow coiled up tubes each inserted in one of said connecting means, said tubes having a relative length and cross-section such as to cause equalization of the steady fluid pressures in said pressure chambers and to prevent fluid pressure variations in said first pressure chamber and cuff in response to pulse fluctuations from entering said buffer chamber.

11. An oscillometer comprising a differential pressure box including a vibratory diaphragm dividing the same into a pair of pressure chambers, a source to provide a compressed fluid medium, connecting means between said source and each of said chambers to create equal steady fluid pressure on said diaphragm, means to cause periodic pressure variations of said medium according to a magnitude to be recorded and/or indicated superimposed upon the steady pressure in one of said chambers, to affect corresponding vibrations of said diaphragm, and further means operatively associated with both said chambers and said connecting means, to provide equal time constants in respect to transmission of pressure changes of said source to said chambers, thereby to maintain balanced instantaneous steady fluid pressures within said chambers.

12. An oscillometer as claimed in claim 11, wherein said last means is comprised of narrow passage means inserted in each of said connecting means between said pressure source and chambers.

13. An oscillometer as claimed in claim 11, wherein said last means is comprised of a pair of auxiliary chambers of adjustable volume each connected to one of said pressure chambers respectively.

References Cited in the file of this patent

UNITED STATES PATENTS

| | | |
|---|---|---|
| 1,905,782 | Andursky | Apr. 25, 1933 |
| 1,924,104 | Boulittle | Aug. 29, 1933 |

FOREIGN PATENTS

| | | |
|---|---|---|
| 322,530 | Great Britain | Dec. 9, 1929 |
| 723,402 | Germany | Aug. 4, 1942 |